United States Patent [19]

Torihata et al.

[11] Patent Number: 5,261,777
[45] Date of Patent: Nov. 16, 1993

[54] PUSHING DEVICE

[75] Inventors: Minoru Torihata; Kazuo Sugiura; Tatsunari Mii, all of Tokyo, Japan

[73] Assignee: Kabushiki Kaisha Shinkawa, Tokyo, Japan

[21] Appl. No.: 855,918

[22] Filed: Mar. 23, 1992

[30] Foreign Application Priority Data

Feb. 22, 1991 [JP] Japan .................................. 3-83292

[51] Int. Cl.5 .................... B65G 25/04; B65G 65/34
[52] U.S. Cl. .................................. 414/417; 198/748; 221/279
[58] Field of Search ................... 198/747, 748, 738; 221/279, 258; 105/31; 213/324; 414/417

[56] References Cited

U.S. PATENT DOCUMENTS

| 4,154,334 | 5/1979 | Ivanov et al. | 198/748 X |
| 4,175,656 | 11/1979 | Lang | 198/748 |
| 4,635,428 | 1/1987 | Nagao | 198/748 |
| 4,717,012 | 1/1988 | Swapp et al. | 198/728 X |

FOREIGN PATENT DOCUMENTS 54-87475  7/1979  Japan.

Primary Examiner—Cheryl L. Gastineau
Attorney, Agent, or Firm—Koda and Androlia

[57] ABSTRACT

In a pushing device used for, for example, lead frame bonding machines, a pusher which feeds out plate-form parts stacked in a storage magazine one by one is belt-driven by a motor so that the moving amount of the pusher (that is, a feed out distance of the plate-form part) can be adjusted as desired, making changeovers of the plate-form parts easy.

2 Claims, 3 Drawing Sheets

PUSHING DEVICE

BACKGROUND OF THE INVENTION

1. Field of the Invention

The present invention relates to a pushing device used for, for example, bonding machines to feed out plate-form parts.

2. Prior Art

Generally, plate-form parts such as lead frames are stored in a storage magazine in a stacked manner. When work, such as bonding, is performed on such lead frames, it is necessary to feed out the lead frames from the magazine one at a time to a predetermined position on feeder rails.

This feed-out operation is usually accomplished in a following manner: Each lead frame is fed out by a fixed amount onto the feeder rails from the storage magazine by a pusher of a pushing device. Alternately, each lead frame can individually be picked up from the magazine by a separating apparatus and placed on the feeder rails. After the lead frame is placed on the feeder rails, it is pushed a fixed distance by the pusher of the pushing device and transported to a working area by a conveying means.

Some conventional pushing devices use air cylinders as a driving source for the pusher. One example of this type of device is described in the Japanese Patent Application Laid-Open ("Kokai") No. 54-87475.

In this prior art, the pusher is driven a fixed distance by air cylinders. Thus, when the type of lead frame to be handled is changed (and more specifically if the length of the lead frame changes), it is, in order to insure the lead frames to be fed out to a prescribed position on the feeder rails, necessary either to change the pusher to another type of pusher or change the position of the pushing device. However, such change-over work requires considerable time and skill. Also, it could result in poor productivity.

SUMMARY OF THE INVENTION

Accordingly, the object of the present invention is to provide a pushing device which can easily cope with changes in the type of product to be handled.

The pushing device for feeding out plate-form parts of the present invention is characterized by the fact that the pusher of the pushing device is driven by a motor.

More specifically, the object of the present invention is accomplished by a unique structure which includes: a pusher supporting plate which holds the pusher, a pusher guide which guides the pusher supporting plate horizontally, a belt which has a fixed horizontal section length so that the pusher supporting plate is mounted to such a horizontal portion so as to be moved together with the belt, and a motor which drives the belt.

Since a motor moves the pusher, the pusher can be moved by any desired amount by controlling the rotation of the motor. In other words, it is only necessary either to input data specifying the amount of movement of the pusher into a motor controller in accordance with the type of plate-form part to be handled or to input data of the type of part to be handled into an arithmetic unit, which then calculates the amount of movement of the pusher. Accordingly, part changeovers can be accomplished very easily.

BRIEF DESCRIPTION OF THE INVENTION

DETAILED DESCRIPTION OF THE INVENTION

Figure 1:
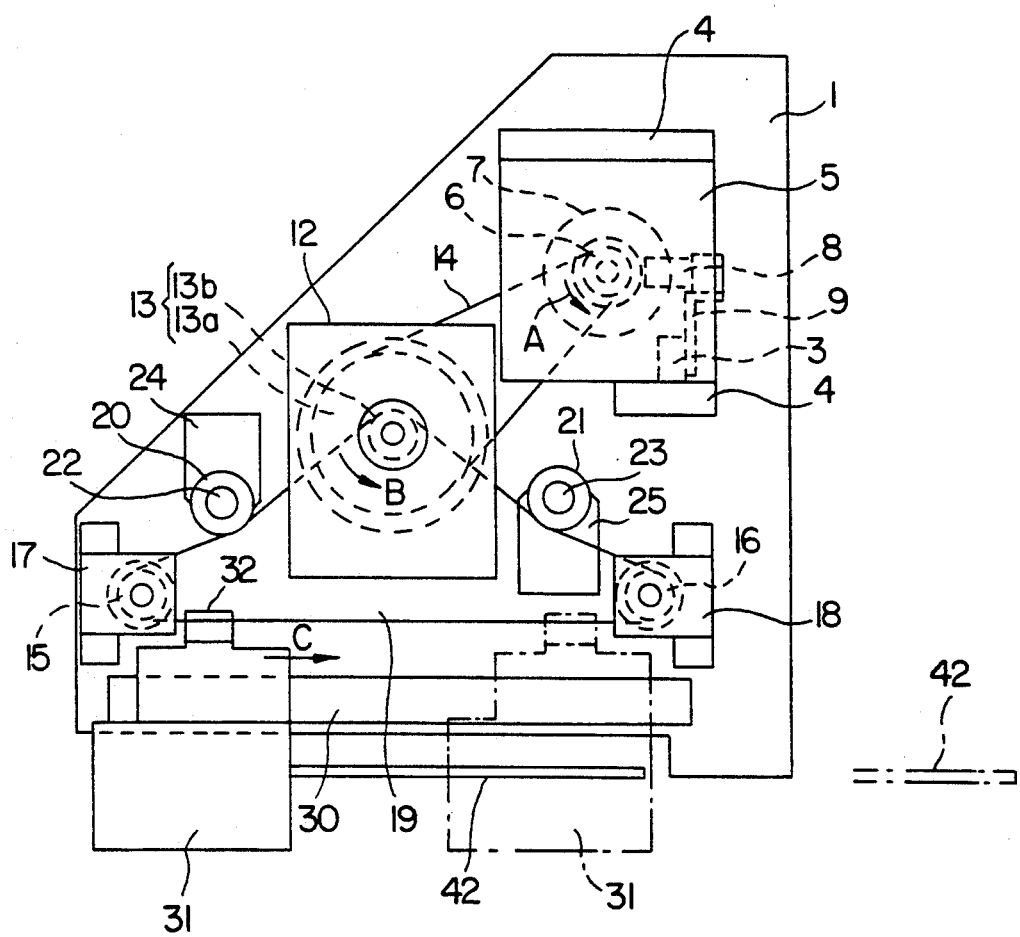
FIG. 1 is a front view of the pushing device according to one embodiment of the present invention.

One embodiment of the present invention will be described below with reference to the accompanying drawings.

Motor supporting plates 4 is mounted to a vertically installed base plate 1 via supports 2 and 3. Motor 5 is installed on the motor supporting plates 4, and a pulley 6 and starting-point detection plate 7 are attached to the output shaft of the motor 5. A starting-point detector 8 which is installed so as to face the starting-point detection plate 7 is provided on a supporting block 9 which is fixed to the base plate 1.

A holding plate 10 is fixed to the base plate 1, and a pulley support 12 is fastened to the holding plate 10 via a multiple number of posts 11.

First pulley 13 has two pulley sections 13a and 13b and is rotatably supported on the pulley support 12. A timing belt 14 is installed between the pulley section 13a and the pulley 6.

Second pulley 15 and third pulley 16 are installed (at a fixed distance from each other on a horizontal line) beneath the first pulley 13. These second and third pulleys 15 and 16 are supported on U-shaped pulley carriers 17 and 18 respectively such that the pulleys 15 and 16 are rotatable. The pulley carriers 17 and 18 are mounted to the base plate 1.

A belt 19 is installed between the pulley section 13b of the first pulley 13 and the second and third pulleys 15 and 16. Tension rollers 20 and 21 press against the belt 19 between the pulleys 13 and 15 and between the pulleys 13 and 16 so as to apply tension to the belt 19. The tension rollers 20 and 21 are rotatable on respective roller supporting shafts 22 and 23. The roller supporting shafts 22 and 23 are fastened to roller supporting plates 24 and 25 which are fixed to the base plate 1.

In addition, the base plate 1 has a pusher guide 30. The pusher guide 30 is beneath the second and third pulleys 15 and 16 and is parallel to a line which connects the second and third pulleys 15 and 16. Thus, the pusher guide 30 is provided horizontally.

Slider 31 is mounted to the pusher guide 30 so that the slider 31 slides along the pusher guide 30. A portion of the belt 19 between the second and third pulleys 15 and 16 is attached to the upper surface of the slider 31 via a fastening plate 32. A pusher supporting plate 33 is fitted to one lower side surface of the slider 31.

Figure 2:
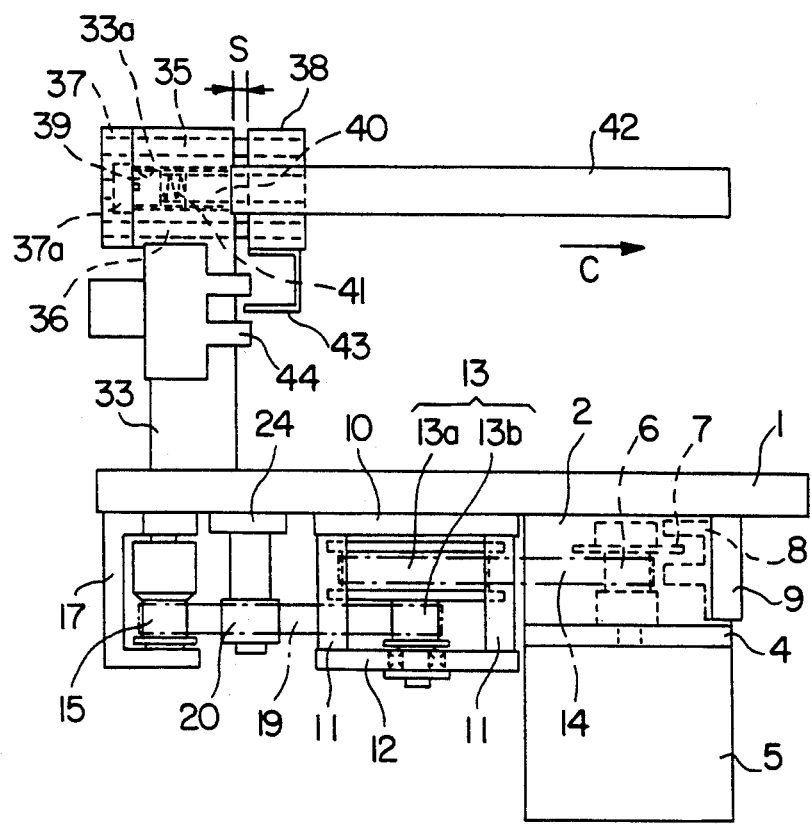
FIG. 2 is a top view thereof.
Figure 3:
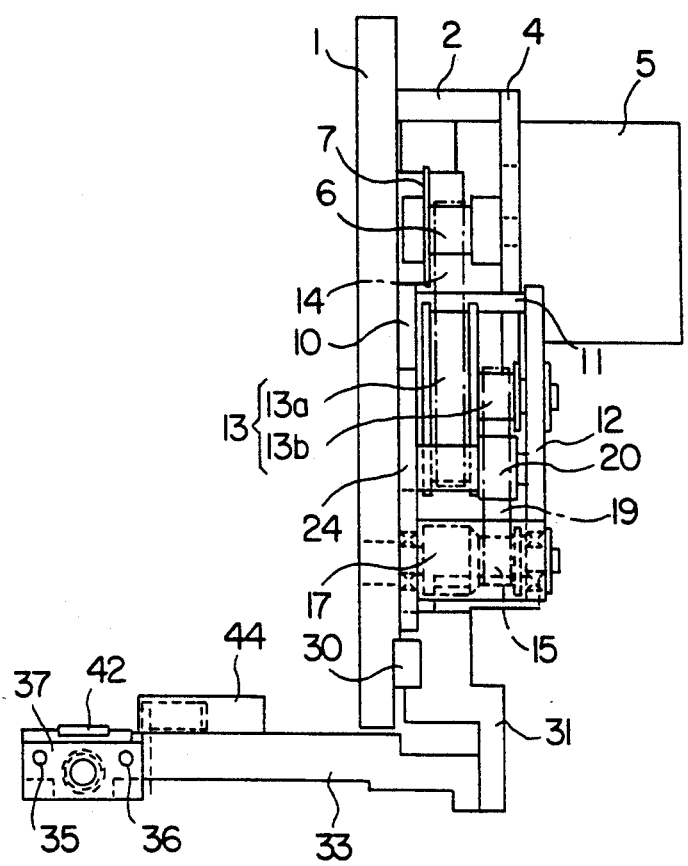
FIG. 3 is a left-side view thereof.

Two guide rods 35 and 36 are slidably inserted in the pusher supporting plate 33. The ends of the guide rods 35 and 36 are attached to first and second bridges 37 and 38 which respectively are installed on both sides of the pusher supporting plate 33. When the first bridge 37 comes into contact with the pusher supporting plate 33, there is a gap S between the second bridge 38 and the pusher supporting plate 33 as shown in FIG. 2.

Screw hole 33a is formed in the pusher supporting plate 33, and a spring-receiving screw 39 is screwed into the screw hole 33 so that the screw 39 is on the first bridge 37 side. The first bridge 37 is provided with a spring escape hole 37a which is larger than the spring-receiving screw 39.

A rod 40, which is inserted into the screw hole 33a, is fastened to the second bridge 38, and a spring 41 is installed between the rod 40 and the spring-receiving screw 39.

The second bridge 38 has a pusher 42 on the upper surface and an overload-detecting plate 43 on the side surface. The pusher supporting plate 33 has an overload detector 44 which faces the overload-detecting plate 43.

In operation, when the motor 5 is caused to rotate by a fixed amount in the direction of arrow A, the pulley section 13a, i.e. the first pulley 13, is caused to rotate in the direction of arrow B via the pulley 6 and timing belt 14. As a result, the slider 31 on the belt 19 is caused to move along the pusher guide 30 in the direction of arrow C. The moved slider 31 is shown by the two-dot line in FIG. 1.

Since the pusher supporting plate 33 is fastened to the slider 31, the pusher supporting plate 33 is also moved as the slider 31 moves. When the pusher supporting plate 33 moves in the direction of arrow C, the second bridge 38, i.e., the pusher 42, is caused to move in the same direction by the driving force of the spring 41 via the rod 40.

As a result, the pusher 42 can push out a plate-form part (such as a lead frame accommodated in a storage magazine or a lead frame positioned on feeder rails, etc. which are not shown in the drawings) by a fixed amount. If the motor 5 is rotated in a reverse direction back to its original starting point, the timing belt 14 and the belt 19 rotate in the opposite directions from those described above, and the pusher 42 returns to its original position.

Since the pusher 42 is driven by the motor 5, the amount of movement of the pusher 42 can be set as desired by merely controlling the amount of rotation of the motor 5. In other words, it is only necessary to input data specifying the amount of movement of the pusher into a motor controller in accordance with the type of plate-form part to be handled. The same results can be obtained by merely inputting data concerning the type of plate-form part to be handled into an arithmetic unit which calculates the amount of movement of the pusher 42. Accordingly, part changeovers can be performed very easily.

In the above embodiment, the pusher 42 is not directly mounted to the pusher supporting plate 33; it is instead linked to the pusher supporting plate 33 via an overload-preventing mechanism. More specifically, if the plate-form part should be caught inside the storage magazine or on the feeder rails when the plate-form part is pushed out by the pusher 42 to advance in the direction of arrow C, an overload will be applied to the pusher 42. When such an overload is applied to the pusher 42, the pusher 42 cannot advance. However, the pusher supporting plate 33 can move by bending the spring 41; in other words, the overload-detecting plate 43 does not move, but the overload detector 44 can move together with the pusher supporting plate 33. As a result, the overload detector 44 is actuated by the overload-detecting plate 43, and the overload is detected, resulting in that the detection signal causes the motor 5 to stop or to operate in the reverse direction so that the pusher 42 is either stopped or retracted. Damages to the plate-form part is thus prevented.

As described above, according to the present invention, since the pusher is driven by a motor, the amount of movement of the pusher can be set as desired by controlling the amount of motor rotation. Thus, part changeovers can be done very easily.

We claim:

1. A pushing device, in which a pusher of said pushing device feeds out lead frames from a storage magazine for semi-conductor processing, comprising:
    a pusher supporting plate which holds said pusher;
    a pusher guide which guides said pusher supporting plate horizontally;
    a belt having a horizontally oriented section of a predetermined length, said pusher supporting plate being fastened to said horizontal section of said belt so that said pusher supporting plate can be moved together with said belt;
    a motor which drives said belt a predetermined distance; and
    an overload preventing means provided between said pusher and said pusher supporting plate and coupled to said motor such that when said pusher is stopped by a lead frame being caught inside said magazine, an overload condition is detected and said motor is stopped.

2. A pushing device, in which a pusher of said pushing device feeds out lead frames from a storage magazine for semi-conductor processing, comprising:
    a pusher supporting plate which holds said pusher;
    a pusher guide which guides said pusher supporting plate horizontally;
    a belt having a horizontally oriented section of a predetermined length, said pusher supporting plate being fastened to said horizontal section of said belt so that said pusher supporting plate can be moved together with said belt; and
    a motor which drives said belt a predetermined distance, said motor being provided above said pusher and driving said belt via a plurality of pulleys and drive belts.

* * * * *